United States Patent
Walster

(10) Patent No.: US 6,658,443 B1
(45) Date of Patent: Dec. 2, 2003

(54) METHOD AND APPARATUS FOR REPRESENTING ARITHMETIC INTERVALS WITHIN A COMPUTER SYSTEM

(75) Inventor: G. William Walster, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 528 days.

(21) Appl. No.: 09/629,935

(22) Filed: Aug. 1, 2000

Related U.S. Application Data

(60) Provisional application No. 60/163,372, filed on Nov. 3, 1999.

(51) Int. Cl.7 .............................. G06F 7/38; G06F 7/50
(52) U.S. Cl. ......................... 708/495; 708/551; 708/671
(58) Field of Search .............................. 708/551, 495; 706/15

(56) References Cited

U.S. PATENT DOCUMENTS

| | | | |
|---|---|---|---|
| 5,600,584 A | * 2/1997 | Schlafly ..................... | 708/551 |
| 5,687,106 A | 11/1997 | Schwarz et al. | |
| 6,044,454 A | 3/2000 | Schwarz et al. | |
| 6,466,924 B1 | * 10/2002 | Tateishi et al. ............... | 706/15 |

OTHER PUBLICATIONS

Michael J. Schulte et al., Hardware Design and Arithmetic Algorithms for a Variable–Precision Interval Arithmetic Coprocessor, Jul. 1995, IEEE Computer Arithmetic Proceedings of the 12 Symposium, p. 222–229.*

Claudio et al., Variability Analysis of Electronic Systems Classical & Interval Methods, 1997, IEEE Proceedings Annual Reliability and Maintainability Symposium, p. 188–193.*

Hernandez et al., Interval Arithmetic BAckpropagation, 1993, IEEE Proceedings of 1993 International Joint Conference on Neural Networks, p. 375–378.*

(List continued on next page.)

*Primary Examiner*—Chuong Dinh Ngo
*Assistant Examiner*—Chat Do
(74) *Attorney, Agent, or Firm*—Park, Vaughan & Fleming LLP

(57) ABSTRACT

One embodiment of the present invention provides a system for representing intervals within a computer system to facilitate efficient and sharp arithmetic interval operations. The system operates by receiving a representation of two intervals. These representations include a first floating-point number representing a first endpoint of the interval and a second floating-point number representing a second endpoint of the interval. Next, the system performs an interval arithmetic operation using the interval operands to produce an interval result. In performing this arithmetic operation, if the first endpoint is negative infinity and the second endpoint is finite, the system treats the first endpoint as a negative overflow toward negative infinity. On the other hand, if the second endpoint is positive infinity and the first endpoint is finite, the system treats the first endpoint as a positive overflow toward positive infinity.

24 Claims, 4 Drawing Sheets

OTHER PUBLICATIONS

Michael et al., A Variable–Precision Interval Arithmetic Processor, 1994, IEEE, p. 248–258.*

Michael et al., A Processor for Staggered Interval Arithmetic, 1995, IEEE, p. 104–112.*

Haas et al., A Frequency Domain Toolbox Using Interval Arithmetic, 1998, UKACC International Conference on CONTROL, p. 1060–1065.*

Christopher et al., Numericaly Stable Fast Recursive Least Squares Algorithms for Adaptive Filtering using Interval Arithmetic, may 1998, Acoustics, Speech, and Signal Processing, p. 1713–1716.*

Majumdar et al., Interval–based Performance Analysis of Computing Systems, Jan. 1995, Modeling Analysis and Simulationof Computer a Telecommunication Systems, p. 345–351.*

Publication, entitled "*Applications of the Proposed IEEE 754 Standard for Floating–Point Arithmetic*" to David Hough, Apple Computer, Inc., vol. 14, Mar. 1981, Long Beach, CA USA, pp. 70–74.

Publication, entitled "*A Combined Interval and Floating–Point Divider*" to James E. Stine & Michael J. Schulte, Computer Architecture and Arithmetic Laboratory, Electrical Engineering and Computer Science Department at Lehigh University, Nov. 1, 1998, pp. 218–222.

Publication, entitled "*IEEE Standard for Binary Floating–Point Arithmetic*," 1985, IEEE, New York, NY, USA, XP–002167724.

* cited by examiner $$X \equiv [\underline{x}, \bar{x}] \equiv \{x \in \Re | \underline{x} \leq x \leq \bar{x}\}$$

$$Y \equiv [\underline{y}, \bar{y}] \equiv \{y \in \Re | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [min(\downarrow \underline{x} \times \underline{y}, \underline{x} \times \bar{y}, \bar{x} \times \underline{y}, \bar{x} \times \bar{y}), max(\uparrow \underline{x} \times \underline{y}, \underline{x} \times \bar{y}, \bar{x} \times \underline{y}, \bar{x} \times \bar{y})]$ (4) $X / Y = [min(\downarrow \underline{x}/\underline{y}, \underline{x}/\bar{y}, \bar{x}/\underline{y}, \bar{x}/\bar{y}), max(\uparrow \underline{x}/\underline{y}, \underline{x}/\bar{y}, \bar{x}/\underline{y}, \bar{x}/\bar{y})], \text{ if } 0 \notin Y$ $X / Y = \Re^*, \text{ if } 0 \in Y$

FIG. 5

| INTERVAL | REPRESENTATION |
|---|---|
| [empty] | [ND_NaN, ND_NaN] |
| [-∞, +∞] | [-inf, +inf] |
| {-∞, +∞} | [+inf, -inf] |
| [-del, b], -fp_max ≤ b ≤ +fp_max | [-inf, B] |
| [a, b], a < b | [A, B] |
| [a, 0], a ≤ -fp_min | [A, +0] |
| [0, 0] | [-0, +0] |
| [eps, b], fp_min ≤ b | [+0, B] |
| [a, -eps], a ≤ -fp_min | [A, -0] |
| [0, b], fp_min ≤ b | [-0, B] |
| [a, +del], -fp_max ≤ a ≤ +fp_max | [A, + inf] |
| [-∞, b], -fp_max ≤ b ≤ +fp_max | [+inf, B] |
| [-∞, a] ∪ [b, +∞]<br>-fp_max ≤ a < b ≤ +fp_max | [B, A] |
| [a, +∞], -fp_max ≤ a ≤ +fp_max | [A, -inf] |

FIG. 6

METHOD AND APPARATUS FOR REPRESENTING ARITHMETIC INTERVALS WITHIN A COMPUTER SYSTEM

RELATED APPLICATION

The application hereby claims priority under 35 U.S.C. §119 to Provisional Patent Application No. 60/163,372 filed on Nov. 3, 1999.

BACKGROUND

1. Field of the Invention

The present invention relates to performing arithmetic operations on interval operands within a computer system. More specifically, the present invention relates to a method and an apparatus for representing arithmetic intervals within a computer system to facilitate efficient arithmetic operations on the intervals.

2. Related Art

Rapid advances in computing technology make it possible to perform trillions of computational operations each second. This tremendous computational speed-makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

Floating-point numbers are generally used to perform most computational tasks in spite of their limitations.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the process used to measure the data values. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining a floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers. One aspect of the present invention is directed to swapping the infimum and the supremum between the first endpoint and the second endpoint for representational purposes.)

However, computer systems are presently not designed to efficiently handle intervals and interval computations. Consequently, performing interval operations on a typical computer system can be hundreds of times slower than performing conventional floating-point operations. In addition, without a special representation for intervals, interval arithmetic operations fail to produce results that are as narrow as possible.

What is needed is a method and an apparatus for representing arithmetic intervals within a computer system that facilitates both efficient arithmetic operations on interval operands and interval results that are as narrow as possible. (Interval results that are as narrow as possible are said to be "sharp".)

SUMMARY

One embodiment of the present invention provides a system for representing intervals within a computer system to facilitate efficient interval arithmetic operations. The system operates by receiving a pair of interval representations. Each representation includes a first floating-point number normally representing a first endpoint of the interval and a second floating-point number normally representing a second endpoint of the interval. Next, the system performs an arithmetic operation using the interval pair to produce a result. In performing interval arithmetic operations, if an interval's first endpoint is negative infinity and its second endpoint is finite, the system treats the first endpoint as the result of a negative overflow toward negative infinity. On the other hand, if an interval's second endpoint is positive infinity and the first endpoint is finite, the system treats the second endpoint as the result of a positive overflow toward positive infinity.

In one embodiment of the present invention for performing interval arithmetic operations, if the second endpoint is negative zero and the first endpoint is less than or equal to the closest negative floating-point number to zero, the system treats the second endpoint as a negative underflow toward zero. On the other hand, if the first endpoint is positive zero and the second endpoint is greater than or equal to the closest positive floating-point number to zero, the system treats the first endpoint as a positive underflow toward zero.

In one embodiment of the present invention for performing interval arithmetic operations, if the second endpoint is positive zero and the first endpoint is either negative zero, or less than or equal to the closest negative floating-point number to zero, the system treats the second endpoint as zero. On the other hand, if the first endpoint is negative zero and the second endpoint is either positive zero, or greater than or equal to the closest positive floating-point number to zero, the system treats the first endpoint as zero.

In one embodiment of the present invention for performing interval arithmetic operations, if the first endpoint is positive infinity and the second endpoint is finite, the system treats the first endpoint as negative infinity. On the other hand, if the second endpoint is negative infinity and the first endpoint is finite, the system treats the second endpoint as positive infinity.

In one embodiment of the present invention for performing interval arithmetic operations, if the first endpoint and the second endpoint are both finite and the first endpoint has a larger value than the second endpoint, the system treats the interval as the union of two semi-infinite intervals (or an exterior interval) comprising a lower interval bounded by negative infinity and the second endpoint, and an upper interval bounded by the first endpoint and positive infinity.

In one embodiment of the present invention, the first floating-point number and the second floating-point number conform to IEEE standard 754 for binary floating-point numbers.

In one embodiment of the present invention, performing interval arithmetic operations involves performing, an interval additional operation, an interval subtraction operation, an interval multiplication operation or an interval division operation. In a variation on this embodiment, the interval operands and the interval result of performing the interval arithmetic operation can be either interior intervals or exterior intervals.

In one embodiment of the present invention for performing interval arithmetic operations, if the first and second interval endpoints of either interval operand or both are non-default not-a-number (NaN) values, the system treats the intervals as the empty interval, which is the same as the empty set.

BRIEF DESCRIPTION OF THE FIGURES

FIG. 5 illustrates four different interval operations in accordance with an embodiment of the present invention.

FIG. 6 illustrates a system for representing intervals using two floating-point numbers in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
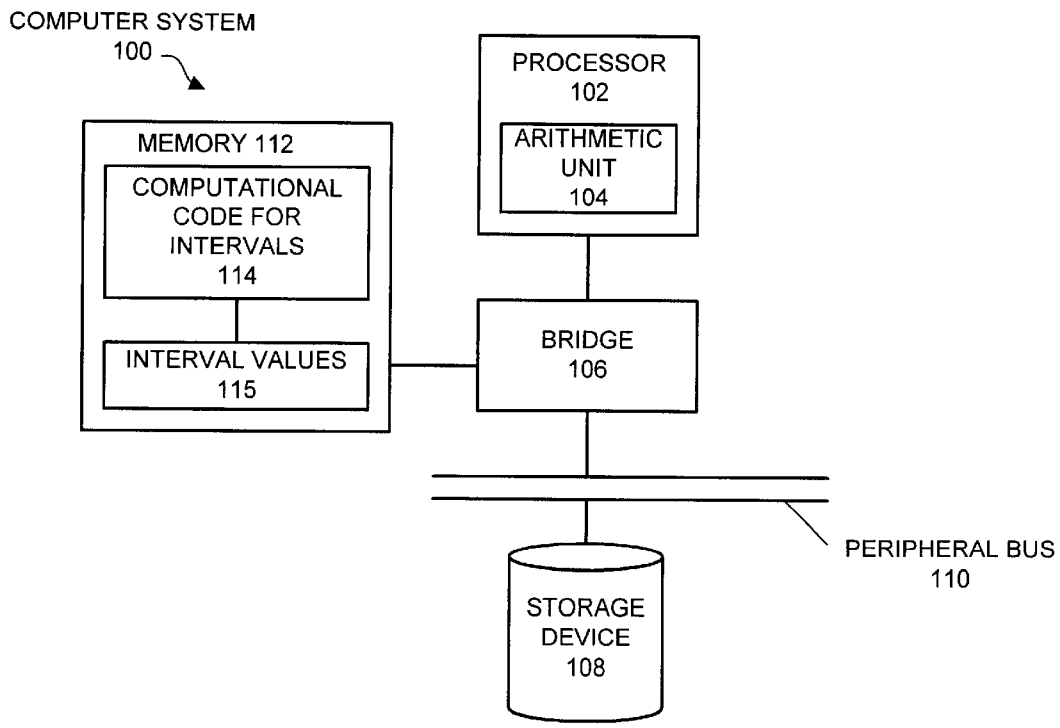
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–6.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
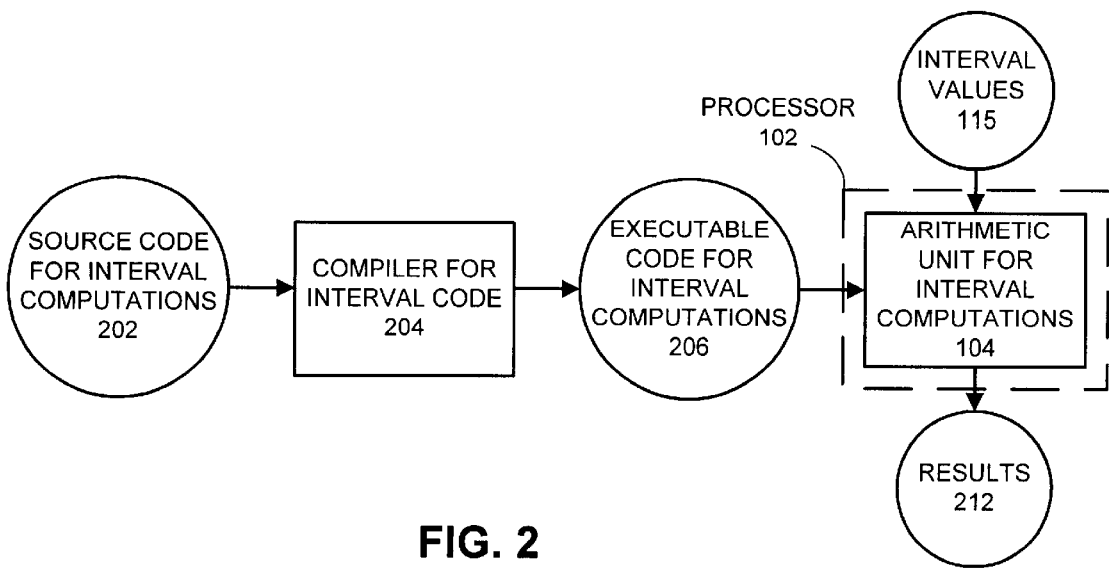
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Arithmetic Unit for Intervals

Figure 3:
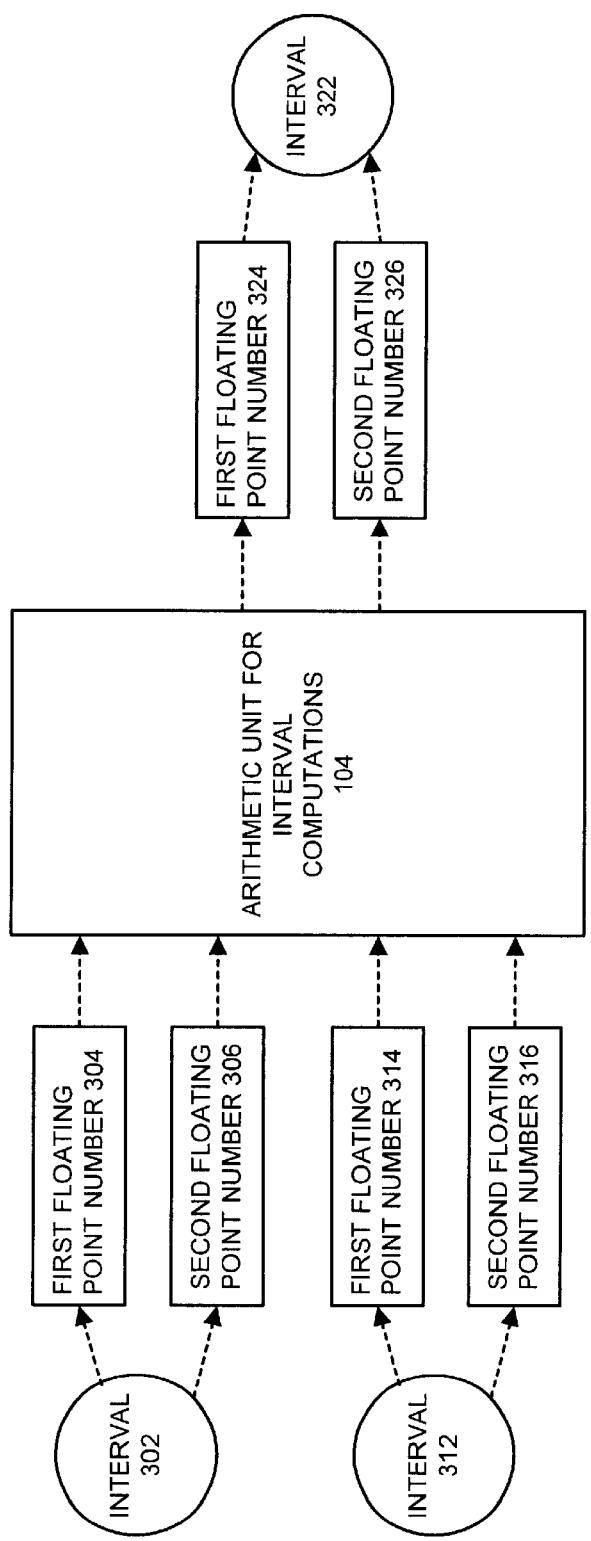
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
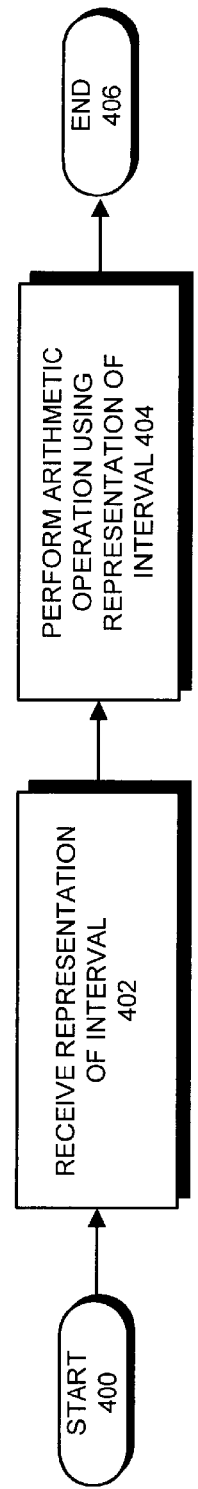
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention.

These interval operations operate on the intervals X and Y. The interval X includes two endpoints, $\underline{x}$ denotes the lower bound of X, and $\overline{x}$ denotes the upper bound of X.

The interval X is a closed, bounded subset of the real numbers R (see line 1 of FIG. 5). Similarly the interval Y also has two endpoints and is a closed, bounded subset of the real numbers R (see line 2 of FIG. 5).

Note that an interval is a point or degenerate interval if $X=[\underline{x}, \overline{x}]$. Also note that the left endpoint of an interior interval is always less than or equal to the right endpoint. The set of extended real numbers, $R^*$ is the set of real numbers, R, extended with the two ideal points minus infinity and plus infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to produce a resulting left endpoint, and adds the right endpoint of X to the right endpoint of Y and rounds up to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X|Y is an exterior interval that is nevertheless contained in the interval $R^{*-}$.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

The intervals X and Y can be represented efficiently as is described below with reference to FIG. 6.

Representing Intervals

FIG. 6 illustrates a system for representing intervals using two floating-point numbers in accordance with an embodiment of the present invention. Note that the below-described scheme for representing intervals can use two floating-point numbers that adhere to the floating-point number format specified in the IEEE standard 754 for binary floating-point arithmetic. In this way, existing floating-point hardware and software can be used. However, note that the present invention can generally be applied to any floating-point representation, and is not limited to IEEE standard 754.

Also note that no additional data are required to represent exterior intervals, underflow conditions or overflow conditions. Hence, the below-described scheme minimizes the memory storage requirements for intervals, and thereby improves cache performance and data throughput. These improvements can greatly improve computational efficiency.

Referring the FIG. 6, the empty interval is represented by [ND__NaN, ND__NaN], wherein ND__NaN is a non-default not-a-number (NaN). Note that IEEE standard 754 specifies a special exponent value to represent a NaN. Note that a default NaN value can be generated as the result of an undefined operation, such as dividing by zero, an underflow or an overflow. By varying the mantissa of the NaN, the NaN value can be customized to be non-default value.

Also note that it is possible to use non-default NaN bit patterns to represent special values, such as $[-\infty, -\infty]$, $[-\delta, -\delta]$, $[-\epsilon, -\epsilon]$, $[+\epsilon, +\epsilon]$, $[+\delta, +\delta]$, or $[+\infty, +\infty]$.

Next, the interval $[-\infty, +\infty]$ can be represented by [−inf, +inf]. Note that IEEE standard 754 also specifies a representation for both positive infinity (+inf) and negative infinity (−inf).

Next, the set {−∞, +∞} (not the interval) is represented by [+inf, −inf].

Next is the case of a negative overflow [−del, b], where −fp_max≦b≦+fp_max, and where −del is a real number in the interval −∞<−del<−fp_max (−fp_max is the smallest negative floating-point number). This interval is represented by [−inf, B], wherein B is any floating-point number in the interval [−fp_max, +fp_max]. Also note that a negative overflow is differentiated from a negative infinity by the sign bit on the left endpoint: −inf on the left endpoint represents a negative overflow; whereas +inf on the left endpoint represents negative infinity.

Next, for two real machine-representable numbers a and b with −fp_max≦a≦−fp_min, or fp_min≦a≦fp_max and similarly for b, and where a<b, the interval [a, b] is represented by [A, B], where A and B are floating-point representations of the finite numbers a and b.

Next is the case of [a, 0] where a≦−fp_min (−fp_min is the closest negative floating-point number to zero). This is represented by [A, +0]. Note that IEEE standard 754 specifies a representation for positive zero (+0) as well as negative zero (−0).

Next is the case of a negative underflow toward zero [a, −eps], where a≦−fp_min (−eps is a real number in the interval −fp_min<−eps <0 which results from a negative underflow toward zero). This interval is represented by [A, −0]. Note that a negative underflow toward zero is differentiated from a zero by the sign bit of the right endpoint: −0 on the right endpoint represents a negative underflow toward zero, whereas +0 on the right endpoint represents zero.

Next, the interval [0, 0] is represented by [−0, +0].

Next is the case of a positive underflow toward zero [eps, b], where b≧fp_min (eps is a real number in the interval 0<eps<fp_min and fp_min is the smallest floating-point number greater than zero). This is represented by [+0, B]. Note that a positive underflow toward zero is differentiated from a zero by the sign bit on the left endpoint: +0 on the left endpoint represents a positive underflow toward zero, whereas −0 on the left endpoint represents a zero.

Next is the case of a negative underflow toward zero [a, −eps], where a<−fp_min (−eps is a real number in the interval −fp_min<−eps<0 and −fp_min is the largest floating-point number less than zero). This is represented by [A, −0]. Note that a negative underflow toward zero is differentiated from a zero by the sign bit on the right endpoint: +0 on the right endpoint represents a zero, whereas −0 on the right endpoint represents a negative underflow toward zero.

Next is the case of [0, b], where fp min≦b. This is represented by [−0, B].

Next is the case of a positive overflow [a, del], where −fp_max≦a≦+fp_max and where del is a real number in the interval fp_max<del<+∞ (fp_max is the largest positive floating-point number). This interval is represented by [A, +inf], where A is any floating-point number in the interval [−fp_max, +fp_max]. Note that a positive overflow is differentiated from positive infinity by the sign bit on the right endpoint: +inf on the right endpoint represents a positive overflow, whereas −inf on the right endpoint represents positive infinity.

Next is the case of [−∞, b], where −fp_max≦b≦+fp_max. This is represented by [+inf, B]. Recall from the discussion of negative overflow above that a +inf value for the left endpoint represents a negative infinity.

Next is the case of an exterior interval [−∞, a] ∪ [b, +∞], where −fp_max≦a<b≦+fp_max. This "exterior interval" is the union of a first interval that extends from −∞ to a, and a second interval that extends from b to +∞. This exterior interval is represented by [B, A], wherein A and B are both finite floating-point numbers, and B is greater than A. Note the an exterior interval reverses the order of A and B to indicate the fact that it represent an exterior interval as opposed to an interior interval.

Next is the case of [a, +∞], where −fp_max≦a≦fp_max. This is represented by [A, −inf]. Recall from the discussion of positive overflow above that a −inf value for the right endpoint represents a positive infinity.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for representing an interval within a computer system to facilitate implementing efficient arithmetic operations using the interval, the method comprising:

receiving a representation of the interval, the representation including a first floating-point number representing a first endpoint of the interval and a second floating-point number representing a second endpoint of the interval; and performing an arithmetic operation using the interval and using a floating-point arithmetic unit to produce a result;

wherein if the first endpoint is negative infinity and the second endpoint is finite, performing the arithmetic operation involves treating the first endpoint as a number less than the smallest negative floating-point number and greater than negative infinity to represent a result of a negative overflow toward negative infinity;

wherein if the second endpoint is positive infinity and the first endpoint is finite, performing the arithmetic operation involves treating the first endpoint as a number greater than the largest positive floating-point number and less than positive infinity to represent a result of a positive overflow toward positive infinity.

2. The method of claim 1, wherein if the second endpoint is negative zero and the first endpoint is less than or equal to a closest negative floating-point number to zero, performing the arithmetic operation involves treating the second endpoint as a number greater than the closest negative floating-point number to zero and less than zero to represent a negative underflow toward zero;

wherein if the first endpoint is positive zero and the second endpoint is greater than or equal to a closest positive floating-point number to zero, performing the arithmetic operation involves treating the first endpoint as a number greater than zero and less than the closest positive floating-point number to zero to represent a positive underflow toward zero.

3. The method of claim 2, wherein if the second endpoint is positive zero and the first endpoint is less than or equal to zero, performing the arithmetic operation involves treating the second endpoint as zero;

wherein if the first endpoint is negative zero and the second endpoint is greater than or equal to zero, performing the arithmetic operation involves treating the first endpoint as zero.

4. The method of claim 3, wherein if the first endpoint is positive infinity and the second endpoint is finite, performing the arithmetic operation involves treating the first endpoint as negative infinity; and wherein if the second endpoint is negative infinity and the first endpoint is finite, performing the arithmetic operation involves treating the second endpoint as positive infinity.

5. The method of claim 4, wherein if the first endpoint and the second endpoint are both finite, and the first endpoint has a larger value than the second endpoint, performing the arithmetic operation involves treating the interval as an exterior interval comprising a lower interval bounded by the second endpoint and negative infinity, and an upper interval bounded by the first endpoint and positive infinity.

6. The method of claim 1, wherein performing the arithmetic operation using the interval involves performing at least one of:

an interval additional operation;

an interval subtraction operation;

an interval multiplication operation; and an interval division operation.

7. The method of claim 6, wherein the result of performing the arithmetic operation includes at least one of:

an interior interval; and an exterior interval.

8. The method of claim 1, wherein if the first endpoint has a non-default NaN value and the second endpoint also has a non-default NaN value, performing the arithmetic operation involves treating the interval as an empty interval.

9. A computer-readable storage medium storing instructions that when executed by a computer cause the computer to perform a method for representing an interval within a computer system to facilitate implementing efficient arithmetic operations using the interval, the method comprising:

receiving a representation of the interval, the representation including a first floating-point number representing a first endpoint of the interval and a second floating-point number representing a second endpoint of the interval; and performing an arithmetic operation using the interval and using a floating-point arithmetic unit to produce a result;

wherein if the first endpoint is negative infinity and the second endpoint is finite, performing the arithmetic operation involves treating the first endpoint as a number less than the smallest negative floating-point number and greater than negative infinity to represent a result of a negative overflow toward negative infinity;

wherein if the second endpoint is positive infinity and the first endpoint is finite, performing the arithmetic operation involves treating the first endpoint as a number greater than the largest positive floating-point number and less than positive infinity to represent a result of a positive overflow toward positive infinity.

10. The computer-readable storage medium of claim 9, wherein if the second endpoint is negative zero and the first endpoint is less than or equal to a closest negative floating-point number to zero, performing the arithmetic operation involves treating the second endpoint as a number greater than the closest negative floating-point number to zero and less than zero to represent a negative underflow toward zero;

wherein if the first endpoint is positive zero and the second endpoint is greater than or equal to a closest positive floating-point number to zero, performing the arithmetic operation involves treating the first endpoint as a number greater than zero and less than the closest positive floating-point number to zero to represent a positive underflow toward zero.

11. The computer-readable storage medium of claim 10, wherein if the second endpoint is positive zero and the first endpoint is less than or equal to zero, performing the arithmetic operation involves treating the second endpoint as zero;

wherein if the first endpoint is negative zero and the second endpoint is greater than or equal to zero, performing the arithmetic operation involves treating the first endpoint as zero.

12. The computer-readable storage medium of claim 11, wherein if the first endpoint is positive infinity and the second endpoint is finite, performing the arithmetic operation involves treating the first endpoint as negative infinity; and wherein if the second endpoint is negative infinity and the first endpoint is finite, performing the arithmetic operation involves treating the second endpoint as positive infinity.

13. The computer-readable storage medium of claim 12, wherein if the first endpoint and the second endpoint are both finite, and the first endpoint has a larger value than the second endpoint, performing the arithmetic operation involves treating the interval as an exterior interval comprising a lower interval bounded by the second endpoint and negative infinity, and an upper interval bounded by the first endpoint and positive infinity.

14. The computer-readable storage medium of claim 9, wherein performing the arithmetic operation using the interval involves performing at least one of:

an interval additional operation;

an interval subtraction operation;

an interval multiplication operation; and an interval division operation.

15. The computer-readable storage medium of claim 14, wherein the result of performing the arithmetic operation includes at least one of:

an interior interval; and an exterior interval.

16. The computer-readable storage medium of claim 9, wherein if the first endpoint has a non-default NaN value and the second endpoint also has a non-default NaN value, performing the arithmetic operation involves treating the interval as an empty interval.

17. An apparatus for representing an interval within a computer system to facilitate implementing efficient arithmetic operations using the interval, the apparatus comprising:

a receiving mechanism that is configured to receive a representation of the interval, the representation including a first floating-point number representing a first endpoint of the interval and a second floating-point number representing a second endpoint of the interval; and an execution mechanism that is configured to perform an arithmetic operation using the interval and using a floating-point arithmetic unit to produce a result;

wherein if the first endpoint is negative infinity and the second endpoint finite, the execution mechanism is configured to treat the first endpoint as a number less than the smallest negative floating-point number and greater than negative infinity to represent a result of a negative overflow toward negative infinity;

wherein if the second endpoint is positive infinity and the first endpoint is finite, the execution mechanism is configured to treat first endpoint as a number greater than the largest positive floating-point number and less than positive infinity to represent a result of a positive overflow toward positive infinity.

18. The apparatus of claim 17, wherein if the second endpoint is negative zero and the first endpoint is less than or equal to a closest negative floating-point number to zero, the execution mechanism is configured to treat the second endpoint as a number treater than the closest negative floating-point number to zero and less than zero to represent a negative underflow toward zero;

wherein if the first endpoint is positive zero and the second endpoint is greater than or equal to a closest positive floating-point number to zero, the execution mechanism is configured to treat the first endpoint as a number greater than zero and less than the closest positive floating-point number to zero to represent a positive underflow toward zero.

19. The apparatus of claim 18, wherein if the second endpoint is positive zero and the first endpoint is less than or equal to zero, the execution mechanism is configured to treat the second endpoint as zero;

wherein if the first endpoint is negative zero and the second endpoint is greater than or equal to zero, the execution mechanism is configured to treat the first endpoint as zero.

20. The apparatus of claim 19, wherein if the first endpoint is positive infinity and the second endpoint is finite, the execution mechanism is configured to treat the first endpoint as negative infinity; and wherein if the second endpoint is negative infinity and the first endpoint is finite, the execution mechanism is configured to treat the second endpoint as positive infinity.

21. The apparatus of claim 20, wherein if the first endpoint and the second endpoint are both finite, and the first endpoint has a larger value than the second endpoint, the execution mechanism is configured to treat the interval as an exterior interval comprising a lower interval bounded by the second endpoint and negative infinity, and an upper interval bounded by the first endpoint and positive infinity.

22. The apparatus of claim 17, wherein the execution mechanism is configured to perform at least one of:

an interval additional operation;

an interval subtraction operation;

an interval multiplication operation; and an interval division operation.

23. The apparatus of claim 22, wherein the result of performing the arithmetic operation includes at least one of:

an interior interval; and an exterior interval.

24. The apparatus of claim 17, wherein if the first endpoint has a non-default NaN value and the second endpoint also has a non-default NaN value, the execution mechanism is configured to treat the interval as an empty interval.

* * * * *